United States Patent
Rossman (10) Patent No.: US 9,843,140 B1
(45) Date of Patent: Dec. 12, 2017

(54) ELECTRICAL CONNECTOR HAVING EXPANDABLE BACKSHELL

(71) Applicant: TYCO ELECTRONICS CORPORATION, Berwyn, PA (US)

(72) Inventor: Jared Evan Rossman, Dover, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/238,091

(22) Filed: Aug. 16, 2016

(51) Int. Cl.
  *H01R 13/514* (2006.01)
  *H01R 13/6581* (2011.01)
  *H01R 13/502* (2006.01)

(52) U.S. Cl.
  CPC ....... *H01R 13/6581* (2013.01); *H01R 13/502* (2013.01); *Y10S 439/906* (2013.01)

(58) Field of Classification Search
  CPC .......................... H01R 13/502; Y10S 439/906
  USPC ........................................ 439/731, 906, 465
  See application file for complete search history.

(56) References Cited

U.S. PATENT DOCUMENTS

| | | | | |
|---|---|---|---|---|
| 4,715,827 A | * | 12/1987 | Furman ................ | H01R 13/514 439/275 |
| 5,195,909 A | * | 3/1993 | Huss, Jr. ............ | H01R 13/6599 439/465 |
| 5,314,357 A | * | 5/1994 | Weidler ............... | H01R 13/518 439/680 |

* cited by examiner

*Primary Examiner* — Tho D Ta (57) ABSTRACT

A backshell includes upper and lower shells defining a cavity. The upper shell includes a top wall and a side wall and the lower shell includes a bottom wall and a side wall. An actuator is coupled to the shells to change the relative positions of the shells between an open position and a closed position. A top of the lower shell engages a bottom of the upper shell in the closed position. The actuator is operable to move at least one of the upper shell and the lower shell such that the top of the lower shell is spaced-apart from the bottom of the upper shell in the open position, thereby increasing a size of the cavity to allow insertion and removal of the electrical connector into or out of the cavity in the open position.

20 Claims, 5 Drawing Sheets

ELECTRICAL CONNECTOR HAVING EXPANDABLE BACKSHELL

BACKGROUND OF THE INVENTION

The subject matter herein relates generally to electrical connector assemblies having backshells.

Electrical connector assemblies are used in many applications. Some electrical connector assemblies include electrical connectors provided at ends of cables. For example, in cable backplane systems, the electrical connectors are provided at ends of cables. The electrical connectors are then electrically connected to corresponding electrical connectors mounted to card assemblies, also known as card connectors. However, the positions of the electrical connectors need to be tightly controlled and maintained for mating with the card connectors. For example, multiple card connectors may be provided on a single circuit card, such as a switch card, and the electrical connectors need to be properly positioned for mating with such card connectors. Additionally, the electrical connectors may be arranged in multiple rows for mating with corresponding stacked circuit cards. Installation, repair and replacement of the electrical connectors in the overall system is difficult and time consuming. For example, typically an entire group of the electrical connectors would need to be removed to repair or replace even a single electrical connector, which leads to longer system downtime and potential damage to other cables or electrical connectors.

A need remains for a communication system that provides easily removable electrical connectors for repair and/or replacement of such electrical connectors.

BRIEF DESCRIPTION OF THE INVENTION

In one embodiment, a backshell for an electrical connector is provided including an upper shell defining a portion of a cavity of the backshell and a lower shell coupled to the upper shell and defining a portion of the cavity of the backshell. The upper shell includes a top wall and an upper shell side wall extending from the top wall to a bottom of the upper shell. The lower shell includes a bottom wall and a lower shell side wall extending from the bottom wall to a top of the lower shell. An actuator is coupled to the upper shell and coupled to the lower shell to change the relative positions of the upper shell and the lower shell between an open position and a closed position. The top of the lower shell engages the bottom of the upper shell in the closed position. The actuator is operable to move at least one of the upper shell and the lower shell such that the top of the lower shell is spaced-apart from the bottom of the upper shell in the open position, thereby increasing a size of the cavity to allow insertion and removal of the electrical connector into or out of the cavity in the open position.

In another embodiment, a backshell for an electrical connector is provided including an upper shell defining a portion of a cavity of the backshell and a lower shell coupled to the upper shell and defining a portion of the cavity of the backshell. The upper shell includes a top wall and an upper shell side wall extending from the top wall to a bottom of the upper shell. The upper shell side wall has an actuator opening extending at least partially therethrough. The lower shell includes a bottom wall and a lower shell side wall extending from the bottom wall to a top of the lower shell. The lower shell side wall has an actuator opening extending at least partially therethrough. An actuator is received in the actuator openings of the upper shell and the lower shell. The actuator is rotatable between a first position and a second position to change the relative positions of the upper shell and the lower shell between an open position and a closed position. The top of the lower shell engages the bottom of the upper shell in the closed position. At least one of the upper shell and the lower shell at least one of the upper shell and the lower shell is movable such that the top of the lower shell is spaced-apart from the bottom of the upper shell in the open position to increase a size of the cavity to allow insertion and removal of the electrical connector into or out of the cavity in the open position.

In a further embodiment, an electrical connector assembly is provided including an electrical connector having a housing holding a plurality of contacts and including a mating end configured to be mated to a mating connector along a mating axis. The electrical connector assembly includes a backshell having a cavity holding the electrical connector. The backshell has a front configured to face the mating connector. The backshell has an upper shell defining a portion of the cavity and a lower shell defining a portion of the cavity. The upper shell includes a top wall and an upper shell side wall extending from the top wall to a bottom of the upper shell. The lower shell includes a bottom wall and a lower shell side wall extending from the bottom wall to a top of the lower shell. The backshell has an actuator coupled to the upper shell and coupled to the lower shell to change the relative positions of the upper shell and the lower shell between an open position and a closed position. The top of the lower shell engages the bottom of the upper shell in the closed position. The electrical connector is captured in the cavity in the closed position. At least one of the upper shell and the lower shell at least one of the upper shell and the lower shell is movable such that the top of the lower shell is spaced-apart from the bottom of the upper shell in the open position to increase a size of the cavity to allow insertion and removal of the electrical connector into or out of the cavity in the open position.

DETAILED DESCRIPTION OF THE INVENTION

Figure 1:
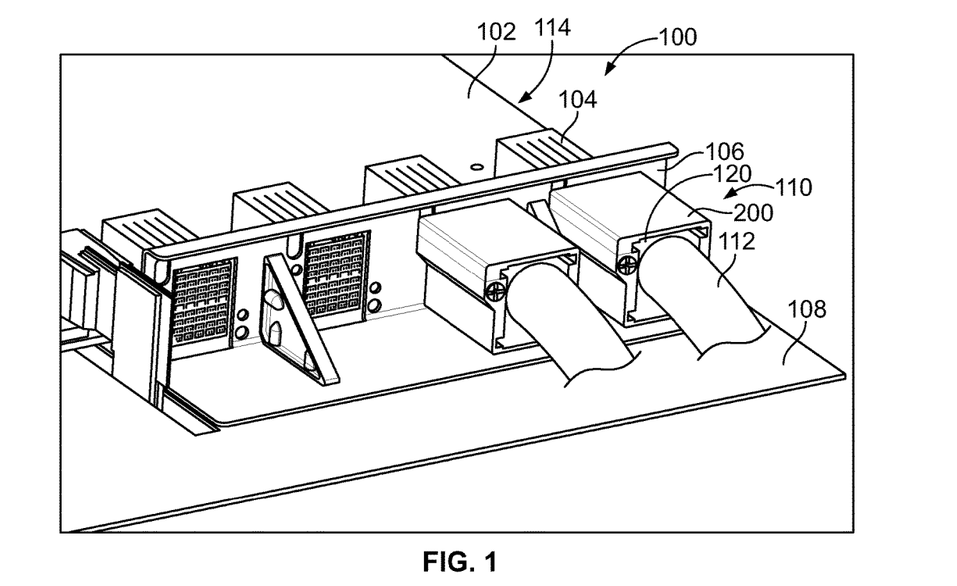
FIG. 1 is a rear perspective view of a portion of a communication system formed in accordance with an embodiment.
Figure 2:
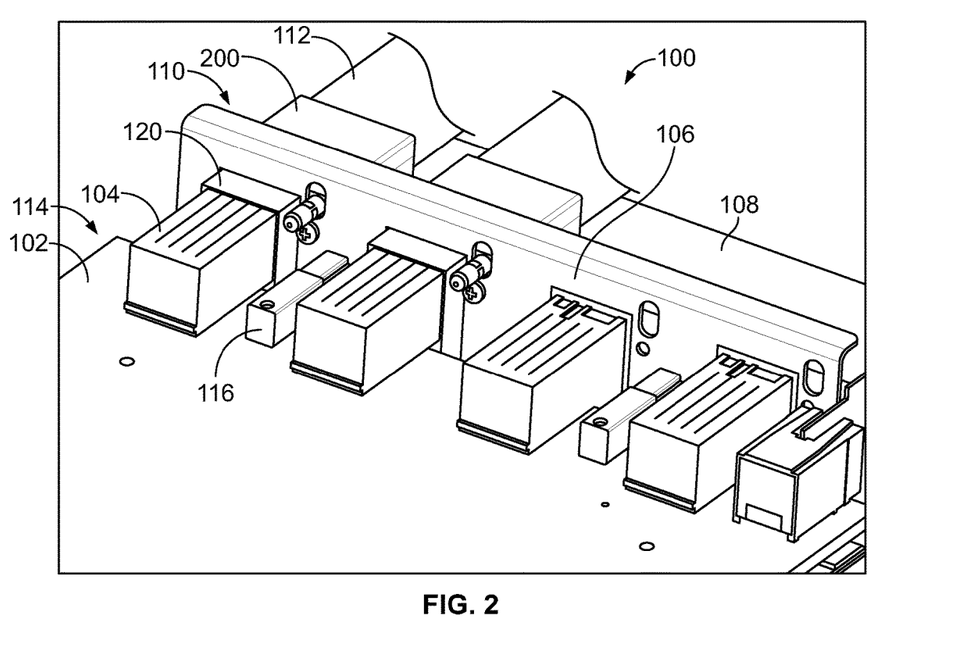
FIG. 2 is a rear perspective view of a portion of a communication system formed in accordance with an embodiment.

FIG. 1 is a rear perspective view of a portion of a communication system 100 formed in accordance with an embodiment. FIG. 2 is a rear perspective view of a portion of a communication system 100 formed in accordance with an embodiment. The communication system 100 includes an electrical connector assembly 110 configured to be electrically connected to one or more electrical connectors 104, which may be mounted to a circuit board 102. In the illustrated embodiment, the electrical connector assembly 110 includes a plurality of electrical connectors 120 supported by corresponding backshells 200 for mating with corresponding electrical connectors 104. In the illustrated embodiment, two of the electrical connectors 120 and corresponding backshells 200 are removed to illustrate the electrical connectors 104. In an exemplary embodiment, the backshells 200 are expandable to allow insertion and/or removal of the electrical connectors 120 from behind the backshells 200, such as for assembly, repair or replacement.

The backshells 200 may be fixed to a backshell support 106 to hold the relative positions of the backshells 200 and the electrical connectors 120 for mating with the electrical connectors 104. For example, the backshell support 106 may be part of a system chassis (not shown) of the communication system 100. In the illustrated embodiment, the backshell support 106 is an L-shaped bracket, which may be manufactured from a stamped and formed piece of sheet metal; however the backshell support 106 may have other shapes or be manufactured from other components in alternative embodiments. The backshell support 106 may be held by a plate 108 of the system chassis, which may be arranged within a frame or rack of the system chassis. Alternatively, the backshell support 106 may be integral with and/or defined by the plate 108. In other various embodiments, the backshell support 106 may be held directly by the frame or rack of the system chassis rather than being mounted to the plate 108. Optionally, the electrical connector assembly 110 may include multiple backshell supports 106, each holding any number of backshells 200 and electrical connectors 120, including a single backshell 200 and corresponding electrical connector 120. The backshells 200 are expandable while being mounted to the backshell support 106 to allow insertion or removal of the electrical connectors 120 without removing the backshells 200 from the backshell support 106.

The electrical connectors 104 are used for data communication. In an exemplary embodiment, each electrical connector 104 is a receptacle connector used as a mating connector for the corresponding electrical connector 120. In the illustrated embodiment, the electrical connectors 120 are provided at ends of corresponding cables 112, which may be routed between electrical connectors 120 of the electrical connector assembly 110 or to electrical connectors 120 of a different electrical connector assembly 110. For example, the communication system 100 may include multiple stacked electrical connector assemblies 110.

In some embodiments, the electrical connector 104 may be part of a card assembly 114, such as a backplane or a daughtercard assembly. In various embodiments, the communication system 100 may include a plurality of the electrical connectors 104 mounted to the circuit board 102 along an edge of the circuit board 102 in which each of the electrical connectors 104 is configured to engage a corresponding electrical connector 120. In the illustrated embodiment, the mating electrical connector 104 is a right-angle connector such that the front or mating end and the bottom or mounting end are oriented substantially perpendicular or orthogonal to each other. More specifically, the front end faces in a receiving direction for mating with the electrical connector 120 and the mounting end faces the circuit board 102. In other embodiments, the receiving side and the mounting side may face in different directions than those shown in FIGS. 1 and 2.

In an exemplary embodiment, the communication system 100 includes one or more guide modules 116 to guide mating of the electrical connector assembly 110 to the mating electrical connector 104. In an exemplary embodiment, the guide modules 116 define mating components and may be referred to hereinafter as mating components 116. The guide modules 116 may guide mating of the card assembly 114 with the electrical connector assembly 110, which may properly position the electrical connectors 104 relative to the electrical connectors 120 during assembly.

Figure 3:
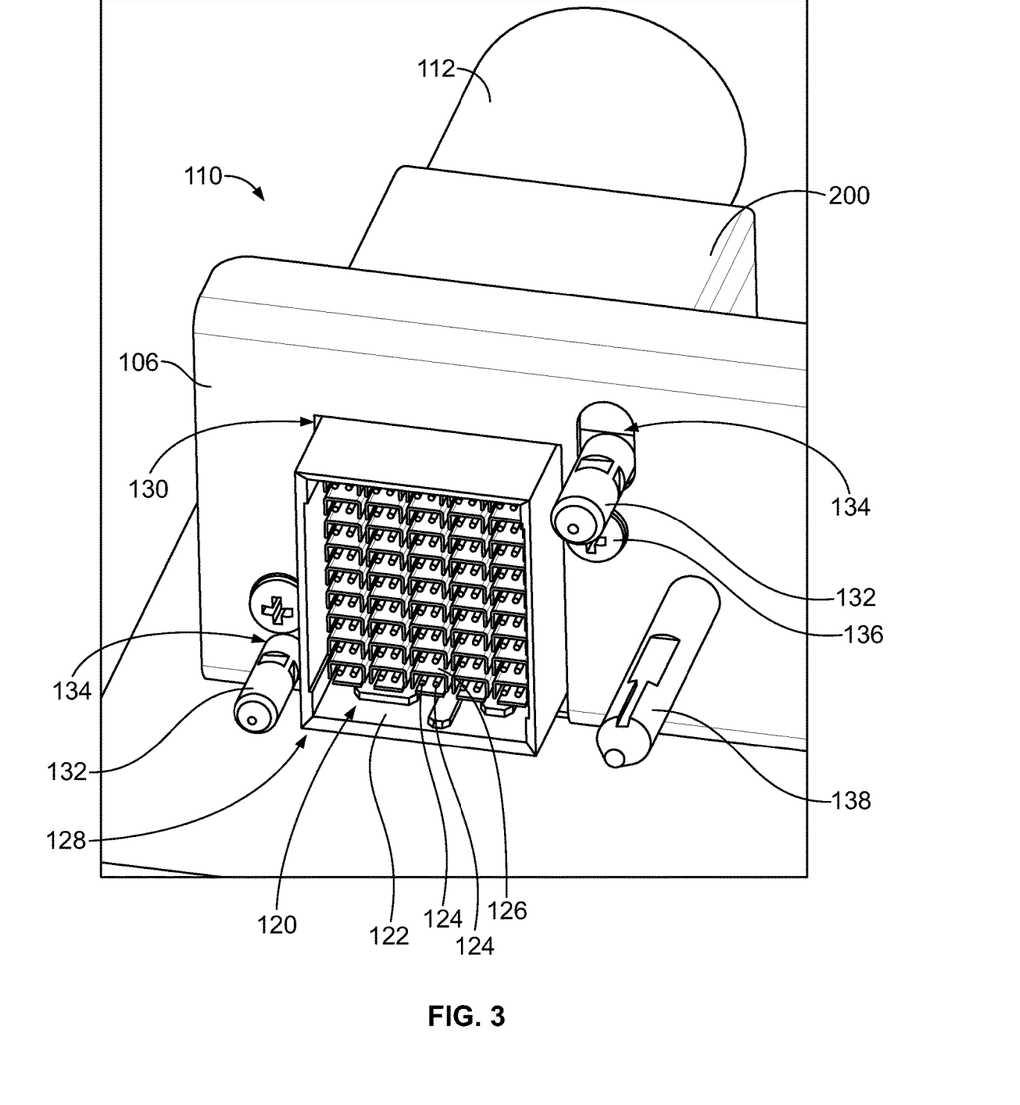
FIG. 3 is a front perspective view of a portion of an electrical connector assembly showing an electrical connector and a backshell mounted to a backshell support.

FIG. 3 is a front perspective view of a portion of the electrical connector assembly 110 showing one of the electrical connectors 120 and the corresponding backshell 200 mounted to the backshell support 106. The backshell 200 may be used to mechanically secure the electrical connector 120 to the backshell support 106 and/or the mating electrical connector 104 (shown in FIG. 1). The backshell 200 may be used to protect the electrical connector 120. The backshell 200 may provide electrical shielding for the electrical connector 120.

The electrical connector 120 has a housing 122 holding a plurality of signal contacts 124. In an exemplary embodiment, the electrical connector 120 includes a plurality of ground contacts 126 surrounding corresponding contacts 124, such as pairs of the contacts 124. Optionally, the signal and ground contacts 124, 126 may be held by contact modules (not shown) received in the back end of the housing 122. Wires of the cable 112 are terminated to corresponding contacts 124, 126, such as within the contact modules, and extend rearward from the electrical connector 120 and the backshell 200. Optionally, the contact modules may be overmolded over the contacts 124, 126 and/or the wires of the cable 112.

The housing 122 has a mating end 128 configured to be mated to the mating electrical connector 104. In the illustrated embodiment, the mating end 128 of the electrical connector 120 extends through an opening 130 in the backshell support 106 and is exposed forward of the backshell support 106 for mating with the mating electrical connector 104 (shown in FIG. 1).

In an exemplary embodiment, the backshell 200 includes positioning features 132 extending forward of the backshell 200 through the backshell support 106 to locate the backshell 200 relative to the backshell support 106. For example, the positioning features 132 may be posts extending forward of the backshell 200. The positioning features 132 pass through openings 134 in the backshell support 106. Optionally, one of the openings 134 is elongated, such as in a vertical direction, to accommodate expanding of the backshell 200. For example, when the backshell 200 is expanded, the positioning feature 132 moves vertically within the elongated opening 134.

Optionally, the backshell 200 may be secured to the backshell support 106 using fasteners 136, such as threaded screws. The fasteners 136 may be secured from the front of the backshell support 106 with the backshell 200 located behind the backshell support 106. The backshell 200 may be secured to the backshell support 106 by other means in alternative embodiments.

Optionally, the backshell support 106 includes a guide pin 138 extending forward of the backshell support 106. The guide pin 138 may be received in the guide module 116 (shown in FIG. 2) to guide mating of the card assembly 114 (shown in FIG. 2) with the electrical connector assembly 110. Mating of the card assembly 114 with the electrical connector assembly 110 may be provided by features other than the guide pin 138 in alternative embodiments. For example, the positioning features 132 may be used as guide pins for mating with the card assembly 114.

Figure 4:
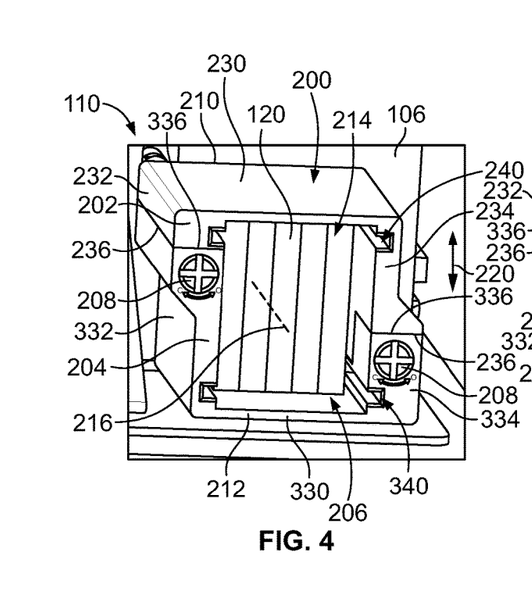
FIG. 4 is a rear perspective view of a portion of the electrical connector assembly showing the backshell in a closed position.
Figure 5:
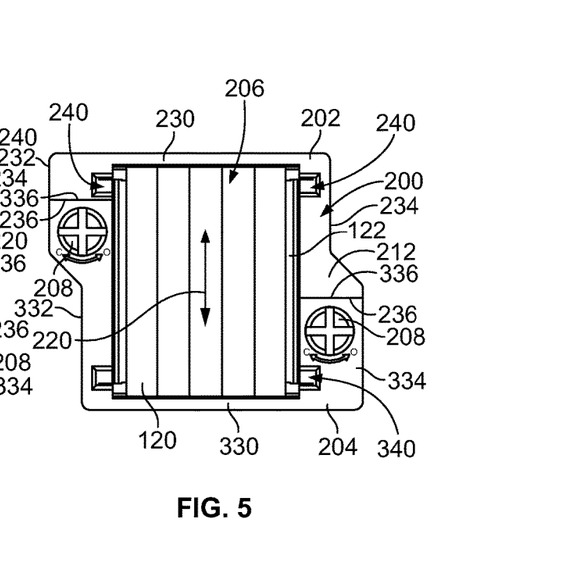
FIG. 5 is a rear view of the backshell in the closed position.
Figure 6:
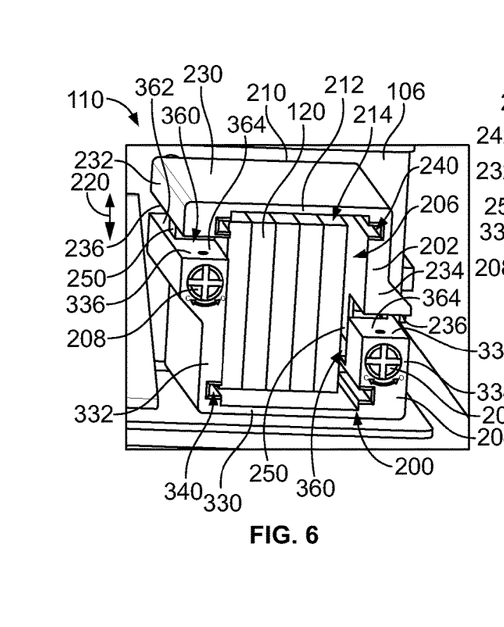
FIG. 6 is a rear perspective view of a portion of the electrical connector assembly showing the backshell in an open position.
Figure 7:
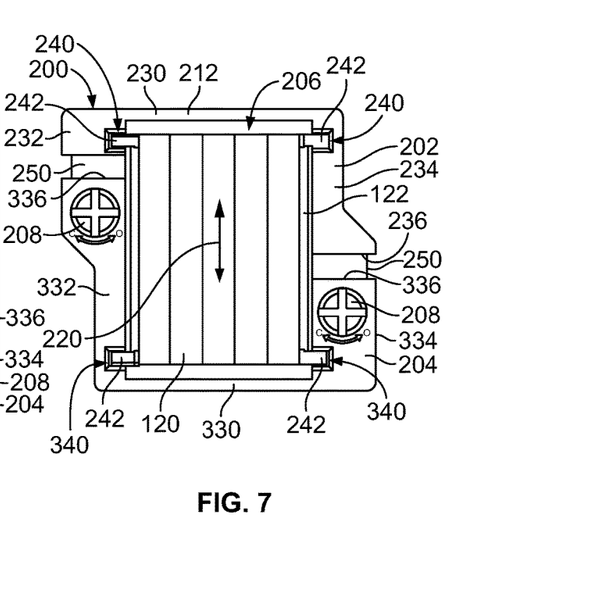
FIG. 7 is a rear view of the backshell in the open position.

FIG. 4 is a rear perspective view of a portion of the electrical connector assembly 110 showing the backshell 200 in a closed position. FIG. 5 is a rear view of the backshell 200 in the closed position. FIG. 6 is a rear perspective view of a portion of the electrical connector assembly 110 showing the backshell 200 in an open position. FIG. 7 is a rear view of the backshell 200 in the open position. The backshell 200 includes an upper shell 202 and a lower shell 204 coupled to the upper shell 202. The backshell 200 includes a cavity 206 defined by the upper and lower shells 202, 204. The backshell 200 includes one or more actuators 208 coupled to the upper shell 202 and coupled to the lower shell 204 to change the relative positions of the upper shell 202 and the lower shell 204 between the open position and the closed position.

The backshell 200 is expandable along a separation axis 220 between the closed and open positions using the actuators 208 by changing relative positions of the upper and lower shells 202, 204. For example, the upper shell 202 may be lifted upward relative to the lower shell 204 and/or the lower shell 204 may be lowered downward relative to the upper shell 202. The separation axis 220 may be generally perpendicular to the cavity axis 216. For example, the separation axis 220 may be generally vertical while the cavity axis 216 may be generally horizontal.

In the illustrated embodiment, the lower shell 204 is fixed relative to the backshell support 106 while the upper shell 202 is movable relative to the lower shell 204 and the backshell support 106. The backshell 200 is expandable to allow insertion and removal of the electrical connector 120 into or out of a cavity 206 of the backshell 200. For example, in the open position, the electrical connector 120 may be loaded into the cavity 206 or may be removed from the cavity 206, while, in the closed position, the backshell 200 may restrict removal of the electrical connector 120 from the cavity 206, thus locking the electrical connector 120 in the backshell 200.

The cavity 206 extends between a mating end or front 210 of the backshell 200 and a cable end or rear 212 of the backshell 200. The backshell 200 defines a cable exit 214 at the rear 212. The electrical connector 120 is received in or removed from the cavity 206 along a cavity axis 216 extending between the front 210 and the rear 212. The cable 112 (shown in FIG. 1) exits the cavity 206 of the backshell 200 through the cable exit 214.

The upper shell 202 includes a top wall 230, a first upper shell side wall 232 and a second upper shell side wall 234 extending from the top wall 230. The side walls 232, 234 extend downward from the top wall 230 to a bottom 236 of the upper shell 202. Optionally, the first upper shell side wall 232 may be shorter than the second upper shell side wall 234, or vice versa.

In an exemplary embodiment, the upper shell side walls 232, 234 include guide slots 240 open at the rear 212 configured to receive portions of the electrical connector 120. For example, the electrical connector 120 may include lugs 242 extending from opposite sides of the housing 122. The guide slots 240 guide the lugs 242 during insertion and removal of the electrical connector 120 from the cavity 206, such as when the backshell 200 is in the open position (FIG. 7). For example, when the upper shell 202 is moved away from the lower shell 204, the lugs 242 become aligned with the guide slots 240 to allow insertion and removal of the electrical connector 120. However, in the closed position (FIG. 5), the guide slots 240 are offset from the lugs 242, thus restricting removal when the backshell 200 is in the closed position.

The upper shell side walls 232, 234 include lugs 250 (FIG. 6) extending therefrom. The lugs 250 extend downward from the bottom edges of the side walls 232, 234. The lugs 250 extend into the lower shell 204. The actuators 208 may be coupled to the lugs 250 to secure the upper shell 202 to the lower shell 204 and to move the upper shell 202 between the open and closed positions with respect to the lower shell 204.

The lower shell 204 includes a bottom wall 330, a first lower shell side wall 332 and a second lower shell side wall 334 extending from the bottom wall 330. The side walls 332, 334 extend upward from the bottom wall 330 to a top 336 of the lower shell 204. Optionally, the side walls 332, 334 may extend generally parallel to each other on opposite sides of the cavity 206. Optionally, the first lower shell side wall 332 may be taller than the second lower shell side wall 334, or vice versa.

In an exemplary embodiment, the lower shell side walls 332, 334 include guide slots 340 open at the rear 212 configured to receive portions of the electrical connector 120. For example, the guide slots 340 receive the lugs 242 during insertion and removal of the electrical connector 120 from the cavity 206, such as when the backshell 200 is in the open position (FIG. 7). However, in the closed position (FIG. 5), the guide slots 340 may be offset from the lugs 242, thus restricting removal when the backshell 200 is in the closed position. In alternative embodiments, the lugs 242 on the lower end of the electrical connector 120 may be aligned with the lower guide slots 340 even in the closed position; however, the upper guide slots 240 may be offset from the lugs 242 at the upper end of the electrical connector 120, thus restricting removal of the electrical connector 120 in the closed position.

The lower shell side walls 332, 334 includes pockets 360 open at the top 336 configured to receive the lugs 250 of the upper shell side walls 232, 234. The lower shell side walls 332, 334 include front braces 362 forward of the pockets 360 and rear braces 364 rearward of the pockets 360. The braces 362, 364 provide support for the lugs 250 and may hold the longitudinal positions of the upper and lower shells 202, 204 relative to each other (for example, by resisting forward or rearward movement of the upper and lower shells 202, 204). The actuators 208 pass through the rear braces 364 to engage the lugs 250. The actuators 208 may pass through the lugs 250 to engage the front braces 362.

Figure 8:
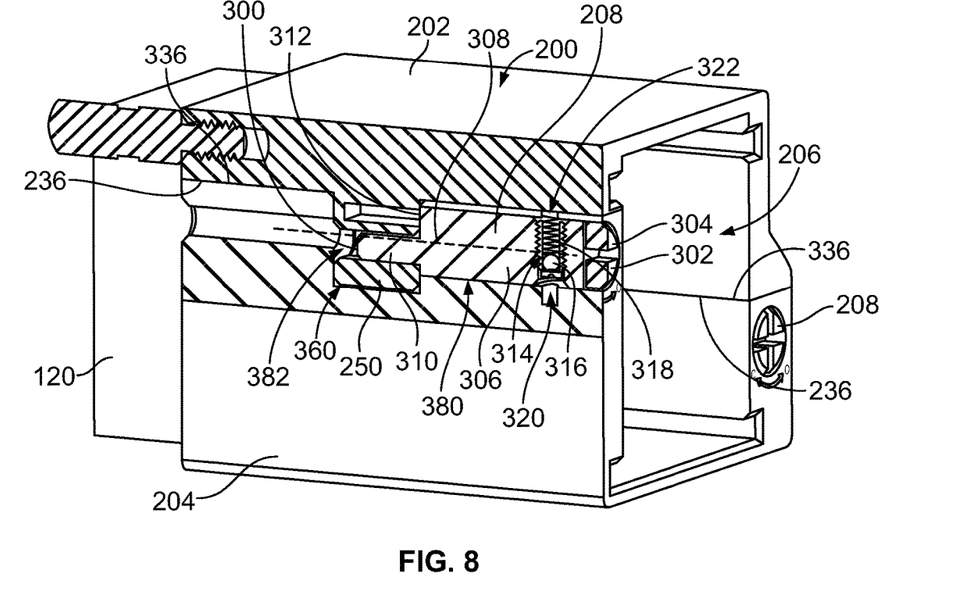
FIG. 8 is partial sectional view of the backshell in a closed position.
Figure 9:
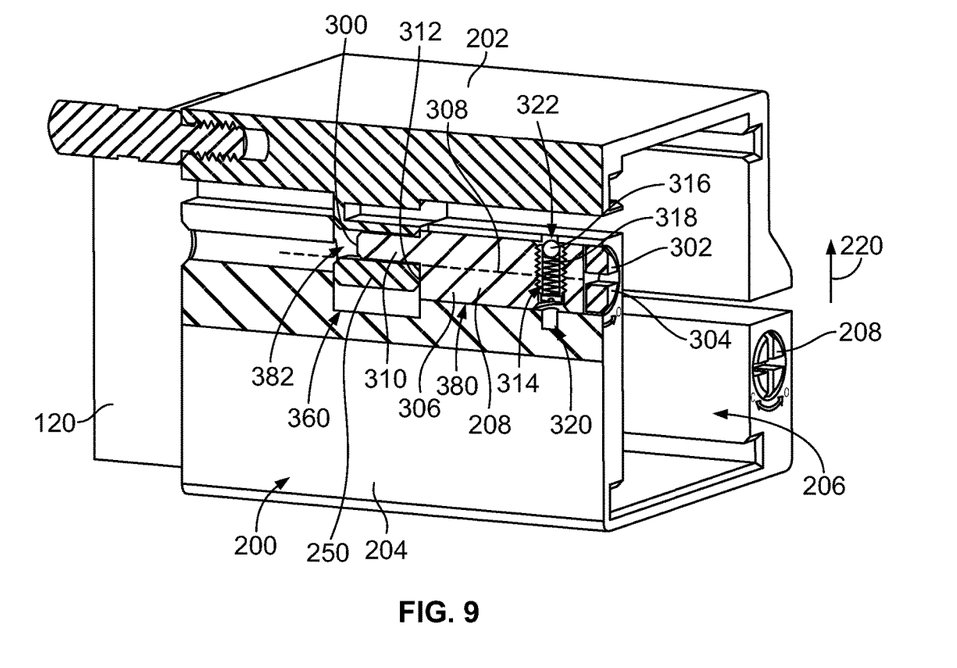
FIG. 9 is partial sectional view of the backshell in an open position.

FIGS. 8 and 9 are partial sectional views of the backshell 200 in closed and open positions, respectively. FIG. 8 illustrates the actuator 208 securing the upper shell 202 to the lower shell 204 in the closed position. FIG. 9 illustrates the actuator 208 securing the upper shell 202 to the lower shell 204 in the open position. When assembled, the upper and lower shells 202, 204 are held together by the actuator 208 and the actuator 208 is operable to open and close or expand and contract the shells 202, 204. The size of the cavity 206 is larger in the open position as compared to the closed position, which allows the electrical connector 120 to be inserted into or removed from the cavity 206 in the open position. The size of the cavity 206 is smaller in the closed position as compared to the open position, closing the shells 202, 204 around the electrical connector 120 to retain the electrical connector 120 in the cavity 206 in the closed position.

In the closed position (FIG. 8), the bottom 236 of the upper shell 202 rests on the top 336 of the lower shell 204. The lug 250 of the upper shell 202 is drawn into the pocket 360 of the lower shell 204 to pull the backshell 200 closed. In an exemplary embodiment, the lower shell 204 includes an actuator opening 380 that receives the actuator 208 and the upper shell 202 includes an actuator opening 382 that receives the actuator 208. As the actuator 208 is moved within the actuator openings 380, 382, such as rotated within the actuator openings 380, 382, the relative positions of the upper and lower shells 202, 204 are changed. For example, the upper shell 202 is moved upward or downward as the actuator 208 is rotated counter-clockwise or clockwise, respectively, or vice versa.

The actuator 208 extends between a front 300 and a rear 302. The actuator 208 includes a head 304 at the rear 302, which may include features to interact with a tool, such as a screwdriver, a wrench or another type of tool used to actuate the actuator 208. The actuator 208 includes a shaft 306 extending along a longitudinal axis 308 of the actuator 208 at the rear 302, such as forward of the head 304, and a cam 310 at the front 300, such as forward of the shaft 306. The actuator 208 is rotatable on the longitudinal axis 308. A flange 312 is defined between the cam 310 and the shaft 306. The cam 310 is offset on the flange 312 from the central longitudinal axis 308. As such, as the actuator 208 is rotated on the longitudinal axis 308, the cam 310 is shifted both horizontally and vertically. The vertical shifting of the cam 310 is transferred to the upper shell 202 to move the upper shell 202 away from the lower shell 204. As such, the cam 310 drives the upper shell 202 away from the lower shell 204 along the separation axis 220 as the shaft 306 is rotated on the longitudinal axis 308 which is generally perpendicular to the separation axis 220.

In an exemplary embodiment, the shaft 306 is received in the actuator opening 380 in the lower shell 204 and the cam 310 is received in the actuator opening 382 in the upper shell 202. In the closed position (FIG. 8), the cam 310 is at a relatively low position relative to the shaft 306, such as at a 6 o'clock position. In the open position (FIG. 9), the cam 310 is at a relatively high position relative to the shaft 306, such as at a 12 o'clock position. The amount of vertical shifting of the cam 310 between the 6 o'clock position and the 12 o'clock position translates to vertical shifting of the upper shell 202 during expansion of the backshell 200. The amount of vertical shifting corresponds to an amount of offset of the cam 310 from the longitudinal axis 308 (for example, 1 mm offset may correspond to 2 mm of vertical shift).

The actuator 208 includes a holding mechanism 314 to hold the actuator 208 in various positions, such as in a first position (for example, 6 o'clock) and in a second position (for example, 12 o'clock). In the illustrated embodiment, the holding mechanism 314 includes a ball bearing 316 and a spring 318 acting on the ball bearing 316. The lower shell 204 has a first detent 320 and a second detent 322 open to the actuator opening 380 at various circumferentially spaced-apart positions (for example, at 6 o'clock and 12 o'clock positions). The first detent 320 receives the ball bearing 316 in the closed position to hold the actuator 208 in the first position. The second detent 322 receives the ball bearing 316 in the open position to hold the actuator 208 in the second position. The spring force holding the ball bearing 316 may be overcome by the tool rotating the actuator 208; however, the spring force is generally strong enough to hold the ball bearing 316 in the detents 320, 322 to avoid accidental or inadvertent opening or closing of the backshell 200.

Figure 10:
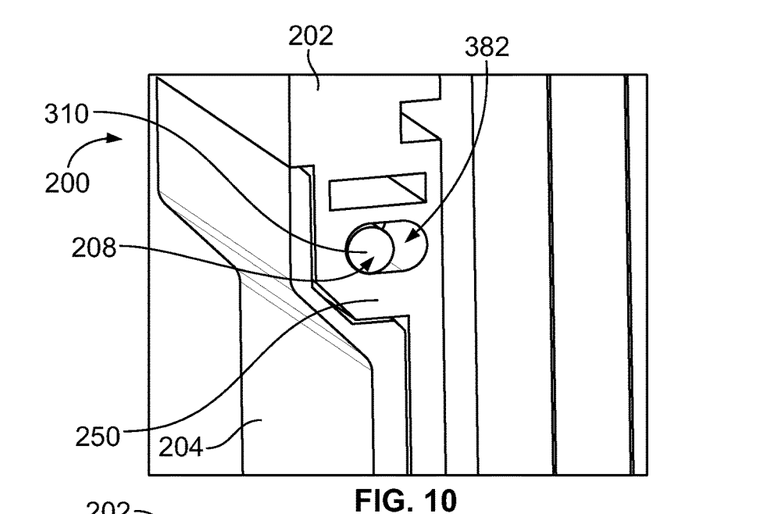
FIG. 10 is a partial sectional view of the backshell in a closed position.
Figure 11:
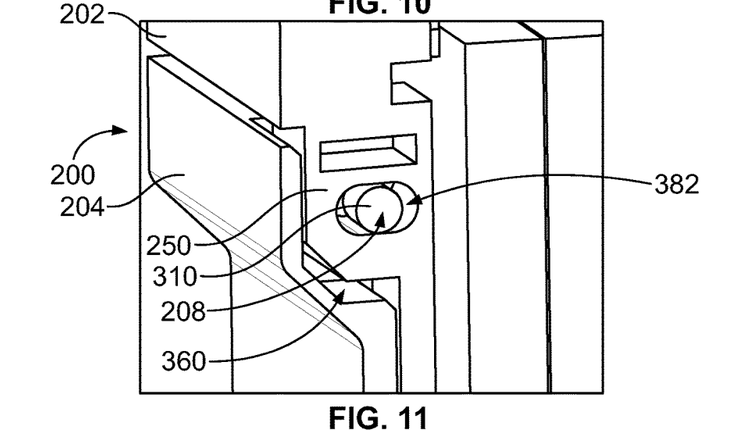
FIG. 11 is a partial sectional view of the backshell in a partially open position.
Figure 12:
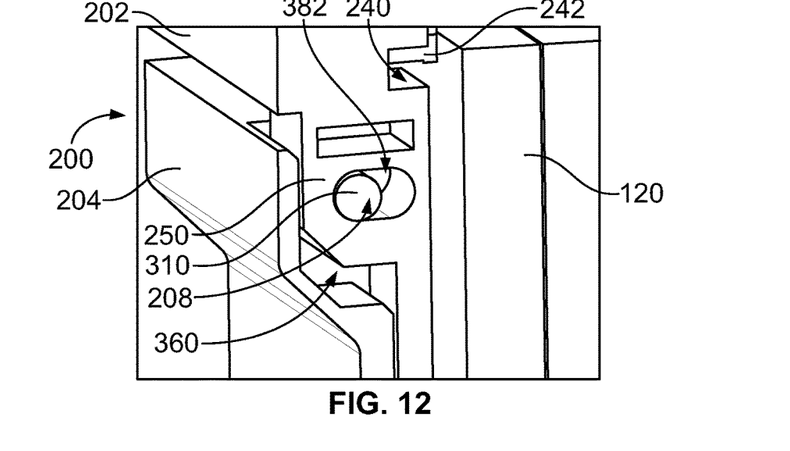
FIG. 12 is a partial sectional view of the backshell in an open position.

FIG. 10 is a partial sectional view of the backshell 200 in a closed position. FIG. 11 is a partial sectional view of the backshell 200 in a partially open position. FIG. 12 is a partial sectional view of the backshell 200 in an open position. FIGS. 10-12 illustrate the upper shell 202 nested in the lower shell 204, showing the lug 250 in the pocket 360. FIGS. 10-12 illustrate the cam 310 of the actuator 208 in the actuator opening 382 in the upper shell 202. In an exemplary embodiment, the actuator opening 382 is elongated in a lateral direction, such as in a horizontal direction. The cam 310 is shown in various positions within the elongated actuator opening 382 at the different closed, partially open and open positions.

In use, as the actuator 208 is rotated, the cam 310 shifts both horizontally and vertically to move the relative positions of the upper shell 202 and the lower shell 204. For example, the cam 310 is rotated along an arcuate path, such as approximately 180° between the 6 o'clock position and the 12 o'clock position. The actuator opening 382 in the upper shell 202 is elongated in the horizontal direction to allow the cam 310 to shift laterally in the horizontal direction as the actuator 208 is rotated. The cam 310 is vertically fixed relative to the upper shell 202 such that vertical movement of the cam 310 causes vertical movement of the upper shell 202 and separation from the lower shell 204. In the partially open position (FIG. 11), a slight gap is formed between the upper and lower shells 202, 204. In the open position (FIG. 12), a larger gap is formed between the upper and lower shells 202, 204. When the backshell 200 is in the open position, the guide slots 240 are aligned with the lugs 242 of the electrical connector 120 to allow the electrical connector 120 to be removed from the backshell 200. The electrical connector 120 may be removed through the rear 212 (shown in FIG. 4), such as without affecting other backshells 200 and corresponding electrical connectors 120. Optionally, the electrical connector 120 may be removed without unmating the card assembly 114 (shown in FIG. 1).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A backshell for an electrical connector, the backshell comprising:
an upper shell defining a portion of a cavity of the backshell, the upper shell including a top wall and an upper shell side wall extending from the top wall to a bottom of the upper shell;
a lower shell coupled to the upper shell and defining a portion of the cavity of the backshell, the lower shell including a bottom wall and a lower shell side wall extending from the bottom wall to a top of the lower shell; and
an actuator coupled to the upper shell and coupled to the lower shell, the actuator being movable between an actuated position and an unactuated position to change relative positions of the upper shell and the lower shell between an open position and a closed position, the top of the lower shell engages the bottom of the upper shell in the closed position, the actuator being operable between the unactuated position and the actuated position to move and drive apart at least one of the upper shell and the lower shell along a separation axis such that the top of the lower shell is spaced-apart from the bottom of the upper shell in the open position, thereby increasing a size of the cavity to allow insertion and removal of the electrical connector into or out of the cavity in the open position.

2. The backshell of claim 1, wherein the backshell includes a front between the top wall and the bottom wall and a cable exit opposite the front, the cavity extending along a cavity axis between the front and the cable exit, the backshell being expandable from the closed position to the open position along the separation axis generally perpendicular to the cavity axis.

3. The backshell of claim 1, wherein the actuator is rotatably coupled to the upper shell and the lower shell.

4. The backshell of claim 1, wherein the actuator includes a cam engaging at least one of the upper shell and the lower shell when the actuator is operated to cause relative movement of the upper shell and the lower shell, the actuator being rotatable on a longitudinal axis of the actuator to drive the upper shell and the lower shell apart along the separation axis perpendicular to the longitudinal axis.

5. The backshell of claim 1, wherein the actuator includes a shaft extending along a longitudinal axis of the actuator and a cam extending from a front of the shaft, the cam being offset from the longitudinal axis, the cam shifting horizontally and vertically as the shaft is rotated on the longitudinal axis to change the relative positions of the upper shell and the lower shell.

6. The backshell of claim 1, wherein the actuator includes a shaft extending along a longitudinal axis of the actuator and a cam extending from a front of the shaft, the cam being offset from the longitudinal axis, the shaft being received in an actuator opening in the lower shell, the cam being received in an actuator opening in the upper shell, the cam driving the upper shell away from the lower shell as the shaft is rotated on the longitudinal axis.

7. The backshell of claim 6, wherein the actuator opening in the upper shell is elongated in a horizontal direction to allow the cam to shift laterally in the horizontal direction as the actuator is rotated, the cam being vertically fixed relative to the upper shell such that vertical movement of the cam causes vertical movement of the upper shell.

8. The backshell of claim 1, wherein the actuator includes a ball bearing and a spring acting on the ball bearing, the lower shell having a first detent and a second detent, the first detent receiving the ball bearing in the closed position to hold the actuator in a first position, the second detent receiving the ball bearing in the open position to hold the actuator in a second position.

9. The backshell of claim 1, wherein the upper shell includes guide slots open at a rear of the upper shell, the guide slots configured to receive lugs of the electrical connector to allow insertion and removal of the electrical connector from the cavity, wherein the guide slots are offset relative to the lugs in the closed position to retain the electrical connector in the cavity in the closed position.

10. The backshell of claim 1, further comprising a guide pin extending forward of the upper shell to guide mating of the backshell with a mating component.

11. A backshell for an electrical connector, the backshell comprising:
an upper shell defining a portion of a cavity of the backshell, the upper shell including a top wall and an upper shell side wall extending from the top wall to a bottom of the upper shell, the upper shell side wall having an actuator opening extending at least partially therethrough;
a lower shell coupled to the upper shell and defining a portion of the cavity of the backshell, the lower shell including a bottom wall and a lower shell side wall extending from the bottom wall to a top of the lower shell, the lower shell side wall having an actuator opening extending at least partially therethrough; and
an actuator received in the actuator openings of the upper shell and the lower shell, the actuator being rotatable between a first position and a second position to change relative positions of the upper shell and the lower shell between an open position and a closed position, the upper shell and the lower shell being driven together as the actuator is rotated from the first position to the second position and the upper shell and the lower shell being driven apart by the actuator as the actuator is rotated from the second position to the first position, the top of the lower shell engages the bottom of the upper shell in the closed position, at least one of the upper shell and the lower shell being movable such that the top of the lower shell is spaced-apart from the bottom of the upper shell in the open position to increase a size of the cavity to allow insertion and removal of the electrical connector into or out of the cavity in the open position.

12. The backshell of claim 11, wherein the backshell includes a front between the top wall and the bottom wall and a cable exit opposite the front, the cavity extending along a cavity axis between the front and the cable exit, the backshell being expandable from the closed position to the open position along a separation axis generally perpendicular to the cavity axis.

13. The backshell of claim 11, wherein the actuator is rotatably coupled to the upper shell and the lower shell.

14. The backshell of claim 11, wherein the actuator includes a cam engaging at least one of the upper shell and the lower shell when the actuator is operated to cause relative movement of the upper shell and the lower shell, the actuator being rotatable on a longitudinal axis of the actuator to drive the upper shell and the lower shell apart along a separation axis perpendicular to the longitudinal axis.

15. The backshell of claim 11, wherein the actuator includes a shaft extending along a longitudinal axis of the actuator and a cam extending from a front of the shaft, the cam being offset from the longitudinal axis, the cam shifting horizontally and vertically as the shaft is rotated on the longitudinal axis to move the relative positions of the upper shell and the lower shell.

16. The backshell of claim 11, wherein the actuator includes a shaft extending along a longitudinal axis of the actuator and a cam extending from a front of the shaft, the cam being offset from the longitudinal axis, the shaft being received in the actuator opening in the lower shell, the cam being received in the actuator opening in the upper shell, the cam driving the upper shell away from the lower shell as the shaft is rotated on the longitudinal axis.

17. The backshell of claim 16, wherein the actuator opening in the upper shell is elongated in a horizontal direction to allow the cam to shift laterally in the horizontal direction as the actuator is rotated, the cam being vertically fixed relative to the upper shell such that vertical movement of the cam causes vertical movement of the upper shell.

18. An electrical connector assembly comprising:
an electrical connector having a housing holding a plurality of contacts, the housing having a mating end configured to be mated to a mating connector along a mating axis; and
a backshell having a cavity holding the electrical connector, the backshell having a front configured to face the mating connector, the backshell having an upper shell defining a portion of the cavity and a lower shell defining a portion of the cavity, the upper shell including a top wall and an upper shell side wall extending from the top wall to a bottom of the upper shell, the lower shell including a bottom wall and a lower shell side wall extending from the bottom wall to a top of the lower shell, the backshell having an actuator coupled to the upper shell and coupled to the lower shell, the actuator being movable between an actuated position and an unactuated position to change relative positions of the upper shell and the lower shell between an open position and a closed position, the top of the lower shell engages the bottom of the upper shell in the closed position, the electrical connector being captured in the cavity in the closed position, at least one of the upper shell and the lower shell being movable as the actuator is moved between the unactuated position and the actuated position to drive apart the upper shell and the lower shell along a separation axis such that the top of the lower shell is spaced-apart from the bottom of the upper shell in the open position to increase a size of the cavity to allow insertion and removal of the electrical connector into or out of the cavity in the open position.

19. The electrical connector assembly of claim 18, wherein the actuator is rotatably coupled to the upper shell and the lower shell.

20. The electrical connector assembly of claim 18, wherein the actuator includes a shaft extending along a longitudinal axis of the actuator and a cam extending from a front of the shaft, the cam being offset from the longitudinal axis, the cam shifting horizontally and vertically as the shaft is rotated on the longitudinal axis to change the relative positions of the upper shell and the lower shell.

* * * * *